Dec. 20, 1955     C. F. BALL ET AL     2,727,639
TIMBER SETTING MACHINE Original Filed May 8, 1947     8 Sheets-Sheet 1

Inventors:
Charles F. Ball.
Richard F. Hair.
By Charles F. Osgood,
attorney.

Inventors:
Charles P. Ball.
Richard P. Hair.
by Charles F. Osgood,
Attorney.

Inventors:
Charles F. Ball.
Richard P. Nair.
by Charles F. Osgood,
Attorney.

United States Patent Office 2,727,639
Patented Dec. 20, 1955

2,727,639

TIMBER SETTING MACHINE

Charles F. Ball and Richard T. Hair, Franklin, Pa., assignors to Joy Manufacturing Company, a corporation of Pennsylvania Continuation of application Serial No. 746,646, May 8, 1947. This application March 11, 1953, Serial No. 341,736

26 Claims. (Cl. 214—77)

This invention relates to timber setting machines and more particularly to an improved machine designed for use in the setting of mine timbering elements such as horizontal cross timbers in an underground mine or tunnel.

In underground mining or tunneling, in accordance with common practice, horizontal cross timbers or bars are placed against the roof as the heading is advanced and set in position by uprights or props, or by rib pinnings. Such setting of the roof cross timbers is an extremely dangerous, arduous and time-consuming task. Also, the mine timbering elements, including cross timbers and props, must be carried underground relatively long distances in the mine or tunnel, and, prior to setting, a timber must be cut to suitable length, and, when placed against the roof, it must be held there in a suitable manner while the uprights or props are properly cut to length and set in place, or during insertion of the rib pins. Heretofore, machines have been designed for reducing the labor, danger and time consumed in the setting of cross timbers, but such machines are limited in range of adjustment, are relatively high and bulky and either do not have sufficient load-carrying capacity or are supplied with mine timbering elements from a trailer. The present invention contemplates improvements over such known machines in that extreme vertical compactness is attained while providing within itself a relatively large carrying capacity for the mine timbering elements, and also a relatively wide range of adjustment and increased flexibility are obtained. The machine of the present invention is also relatively rugged, powerful in operation and relatively foolproof, thereby substantially increasing the safety factor.

It is accordingly an object of the present invention to provide an improved timber setting machine. Another object is to provide an improved timber setting machine having an improved adjustable supporting structure for receiving and supporting a cross timber, for raising the timber against the roof and for holding it there during setting thereof. Yet another object is to provide an improved timber setting machine having an improved timber and prop carrying compartment arranged in a novel manner, with the bottom of the compartment located in a relatively low position so that a large number of timbers and props can be transported while maintaining the overall height of the machine relatively low, enabling the machine to operate in mines or tunnels having low head room. A further object is to provide an improved timber receiving, supporting and elevating structure arranged in a novel manner with respect to the load carrying compartment whereby not only a relatively large timber and prop load can be carried but also resulting in an extremely sturdy and compact construction. A still further object is to provide an improved timber setting machine having a large carrying compartment for the mine timbering elements arranged in a relatively low position centrally lengthwise of the machine and an improved timber supporting and lifting boom frame arranged and mounted in a novel manner with respect to the timber-element carrying compartment. Another object is to provide an improved boom-frame-lift structure for receiving, supporting and elevating the cross timbers and improved power operated means for swinging the boom structure. Still another object is to provide an improved slidable turntable mounting at the outer extremity of the boom frame structure whereby the turntable may be located at different positions laterally of the timber receiving compartment of the machine to receive timbers located in different lateral positions in the compartment. Still a further object is to provide an improved parallel motion boom structure for the timber carrying support whereby the timber support is always maintained in a horizontal position irrespective of the angular position of the boom frame structure. Another object is to provide an improved boom frame structure and timber supporting turntable wherein the boom frame structure is arranged and mounted in a novel manner, thereby enabling positioning of the turntable relatively close to the bottom of the timber carrying compartment so that timbers may be readily moved from the compartment onto the turntable. A still further object is to provide an improved timber setting machine having an improved hydraulic system, and improved control means for the several hydraulically operated devices of the machine. It is a further object of the invention to provide an improved timber setting machine having an improved arrangement and combination of parts. These and other objects and advantages of the invention will, however, hereinafter more fully appear.

This application is a continuation of our copending application Serial No. 746,646 filed May 8, 1947, now abandoned.

In the accompanying drawings there is shown for purposes of illustration one form which the invention may assume in practice.

In these drawings:

Fig. 2 is a side elevational view of the machine shown in Fig. 1, with an upward-swung position of the boom frame and an elevated position of the turntable indicated in dotted lines.

The improved timber setting machine is especially designed for use in trackless mines, and, as shown in the drawings, comprises a low compact body 1 of generally rectangular shape mounted on rubber tired wheels adapted to travel over the floor of a mine or tunnel. The front wheels 2, 2 are traction wheels and are driven by suitable motors 3 herein preferably electric motors, through suitable transmission connections 4, and the rear wheels 5, 5 are steering wheels and are swiveled to turn horizontally and are provided with suitable steering gear operated by a hand wheel 6 located in a recess providing the operator's station at one corner of the machine body. It will be understood that either end of the machine may be considered the front end and that, in this instance, the end at which the timber support is located is considered the front end, with the operator's station located at the rear end. Mounted on the machine body intermediate the front and rear wheels at one side of the machine is a motor 7, likewise preferably an electric motor, for driving a pumping mechanism to be later described. Extending centrally lengthwise of the machine body is a load carrying compartment 8 of substantial width and height, and straddling this compartment is a boom frame 9 carrying at its forward end, a horizontal turntable or rotatable saddle 10 providing a timber support. The load carrying compartment is adapted to receive a load of mine timbering elements such as cross timbers and props, and when the boom frame and turntable are properly positioned with respect to the timbering element compartment, a timber may be moved lengthwise from the compartment onto the turntable. The boom frame may then be swung upwardly to elevate the turntable above the top of the machine body and then the turntable may be turned to locate the timber in a crosswise position. The boom frame may then be swung upwardly further to elevate the turntable to bring the cross timber up against the roof and to hold it there during setting of the uprights or props, or during insertion of the rib pins. At the other corner of the same end of the body as the operator's station is a cable reeling mechanism 11 for the power conductor cable for the electric motors 3 and 7, and this reel is driven by a conventional hydraulic motor 12. At the corner of the opposite end of the machine body is a power saw 13, driven by a conventional hydraulic motor 14. Also at the opposite end of the machine body, at the same side thereof as the operator's station, is a conventional electrical control apparatus 15 for the electric motors. Hydraulic jack devices 16, 16 beneath the boom frame are provided for swinging the latter.

Figure 1:
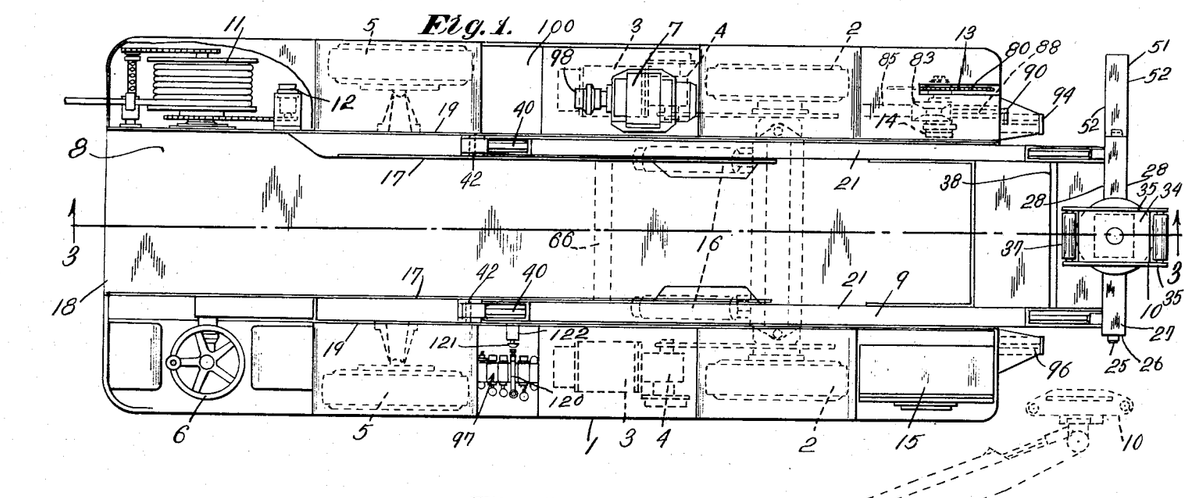
Fig. 1 is a top plan view of a timber setting machine constructed in accordance with an illustrative embodiment of the invention.
Figures 3, 4, 5, 6:
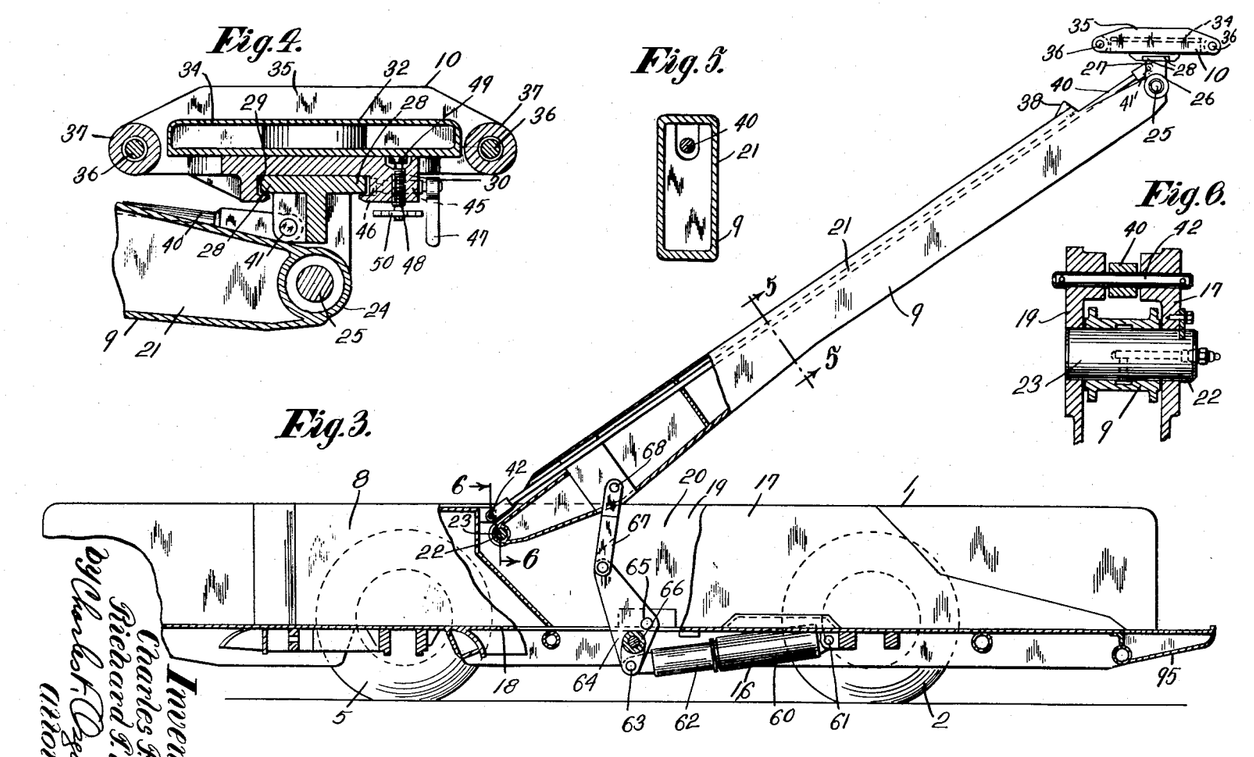
Fig. 3 is an enlarged view in central longitudinal vertical section taken substantially on line 3—3 of Fig. 1, with the boom frame swung upwardly to elevate the turntable and with parts broken away to show structural details.
Fig. 4 is an enlarged vertical sectional view taken on line 4—4 of Fig. 9, showing the turntable lock.
Fig. 5 is an enlarged cross-sectional view taken on line 5—5 of Fig. 3, showing the boom frame structure.
Fig. 6 is an enlarged detail section taken on line 6—6 of Fig. 3.
Figure 6:
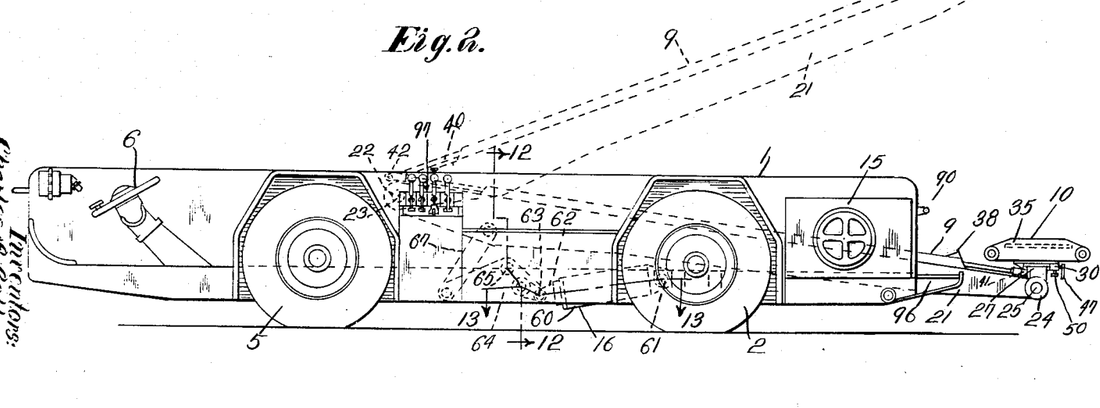
Figure 7:
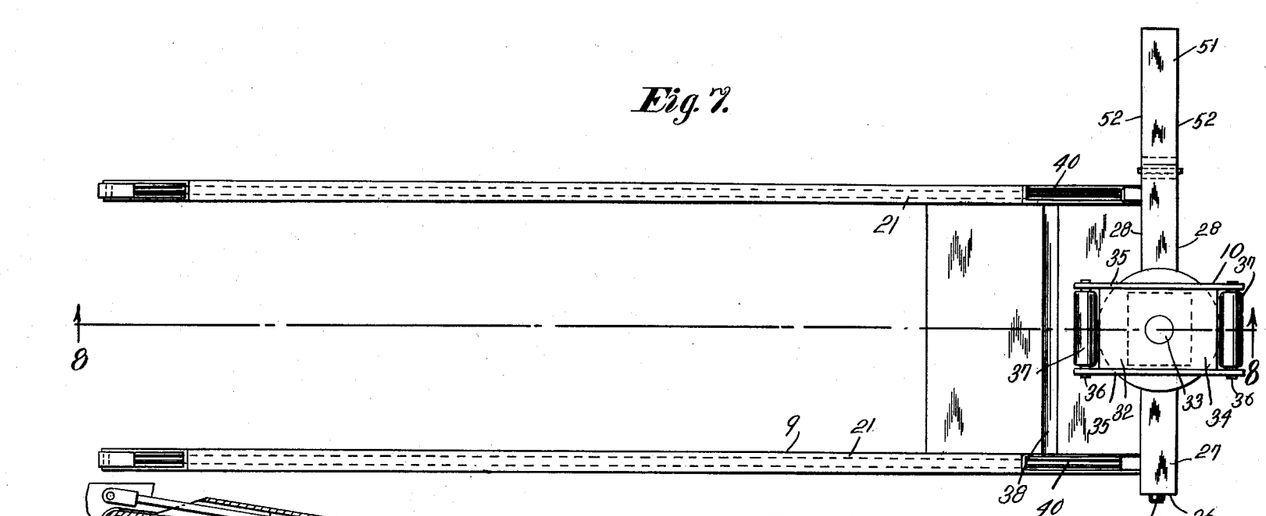
Fig. 7 is an enlarged plan view of the boom frame and turntable.
Figure 8:
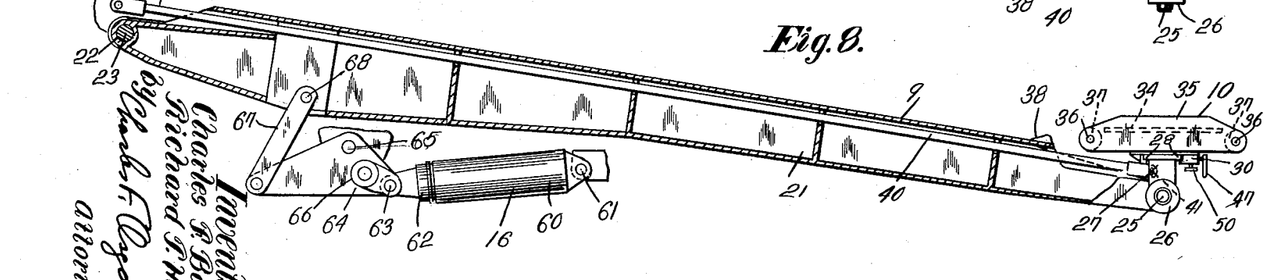
Fig. 8 is a central longitudinal vertical sectional view, with parts in full, taken through the boom frame and turntable on line 8—8 of Fig. 7, and showing parts of the boom elevating mechanism.
Figure 9:
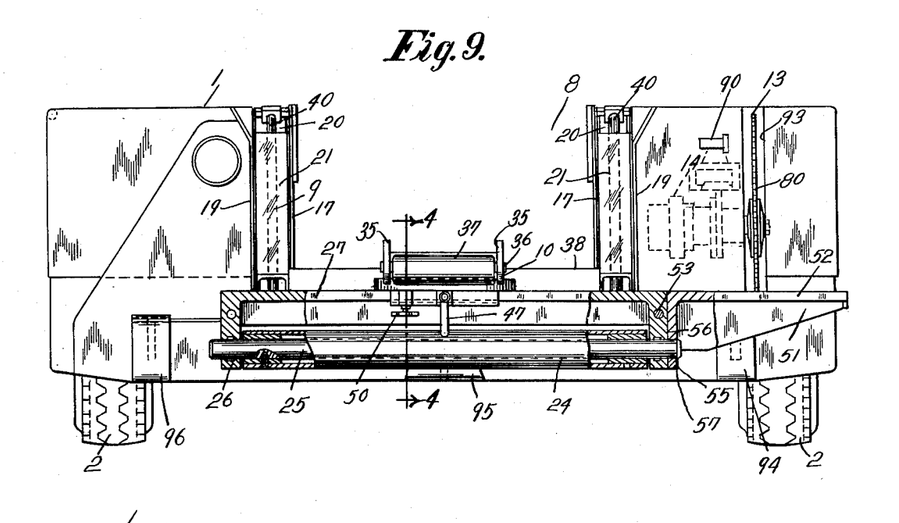
Fig. 9 is an enlarged front end elevational view of the timber setting machine shown in Figs. 1 and 2, with parts in vertical section to illustrate structural details.
Figure 10:
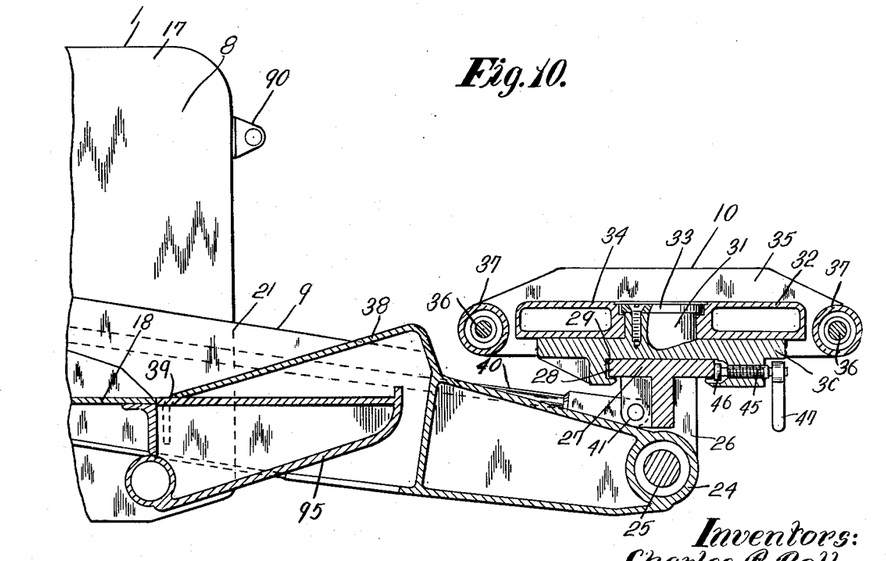
Fig. 10 is an enlarged vertical sectional view taken in the plane of Fig. 3, showing details of the boom frame and turntable structure and associated parts of the machine body.
Figure 11:
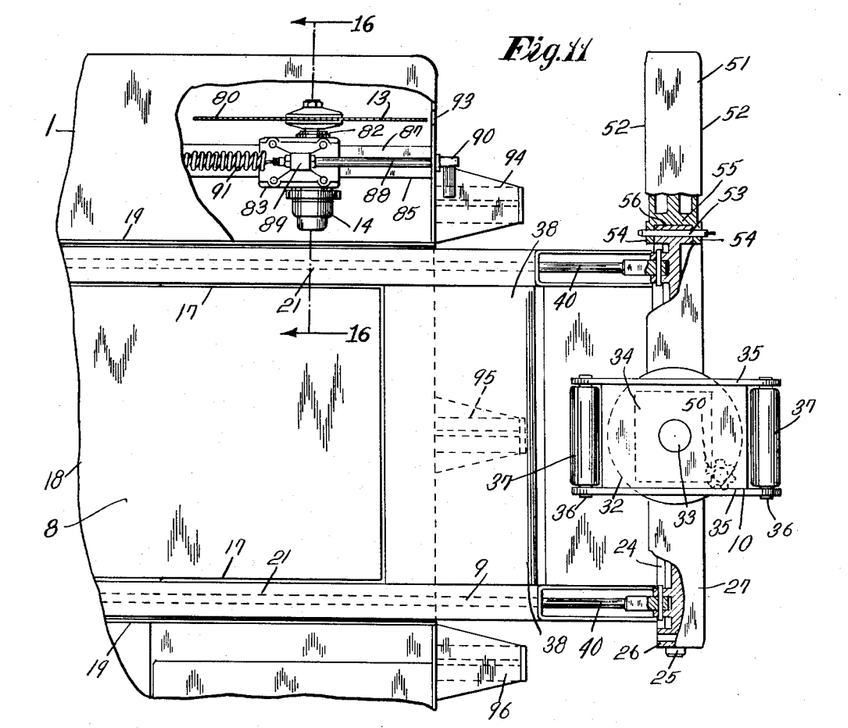
Fig. 11 is an enlarged fragmentary plan view of the forward portion of the machine shown in Fig. 1, with certain parts broken away and with others in horizontal section.

The machine body is herein preferably of a fabricated, welded construction and has vertical plates 17, 17 extending in parallelism lengthwise of the machine and forming the sides of the load carrying compartment 8, and a horizontal bottom plate 18 provides the compartment bottom. Spaced outwardly from the side plates 17 are parallel vertical plates 19, 19, and there is a vertical space 20 provided between each pair of plates 17, 19, and these spaces open outwardly through the forward end of the machine body, as shown in Figs. 9 and 10. The boom frame is generally U-shaped in plan and has parallel side arms 21 of rectangular cross section, as shown in Fig. 5, arranged in the spaces 20, and these side arms are pivoted at 22 on horizontal pivot pins 23 suitably secured to the pairs of vertical plates 17, 19, as shown in Fig. 6. The horizontal aligned pivots of the boom frame arms are located in a relatively high position near the top of the machine body in advance of the rear steering wheels, as shown in Fig. 3. The outer ends of the side arms project forwardly outwardly from the spaces 20 at the front end of the machine body and are integrally connected by a horizontal cross frame 24 (Figs. 9 and 10) located in advance of the machine body. Secured in a transverse bore in the cross connecting frame 24 is a horizontal shaft 25 having its ends projecting outwardly and on which end portions 26 of a transverse frame 27 are pivotally supported (see Fig. 9). This transverse frame is substantially coextensive with the cross frame 24 and has lateral horizontal guides 28 which are received in guideways 29 on a slidable support 30 (Fig. 10). This slidable support has an upstanding circular bearing portion 31 on which the frame 32 of the horizontal turntable or saddle 10 is swivelly mounted. A cap plate 33, recessed in the top of the turntable frame and secured by screws to the bearing portion 31, serves to retain the turntable frame on its bearing mounting on the slidable support. The turntable has a horizontal timber receiving and supporting platform 34 and is formed with upstanding sides or side retaining walls 35 for guiding the timber and retaining it in position on the turntable platform. If desired, the timber receiving platform may be non-rotatable and the side portion which retains the timber against lateral movement of the platform may be swiveled on the bearing mounting to turn relative to the platform, so that the timber may be manually turned on the platform with the swiveled sides. In this latter construction, there would be no turntable, but the result would be similar, with the exception that the timber would turn relative to the platform. These side portions of the turntable frame project laterally beyond the platform 34 and carry transverse shafts 36 on which rollers 37 are journaled. These rollers extend substantially the full width of the turntable platform 34 and are preferably arranged with their tops located a slight distance below the platform 34 so that a timber may be easily moved onto and positioned on the turntable. Secured to the side arms 21 of the boom frame and extending across the boom frame just rearwardly of and in parallelism with the cross frame is an upwardly inclined deflector plate or guide 38 for directing a timber as it is slid lengthwise from the timber-compartment onto the adjacent roller, as for example, when the turntable is positioned as shown in Fig. 10. This deflector frame is suitably cut away at 39 at its bottom to clear a projection on the machine body when the boom frame is in its lowermost position shown and as later explained more in detail. A pair of rods 40, parallel with the boom frame, are pivotally connected at their forward ends at 41 to pivot pins carried by ears on the transverse guide frame 27 and extend rearwardly through openings in the boom frame (Fig. 5) and are pivotally connected at their rear ends at 42 to pivot pins supported by the vertical plates 17, 19 (see Fig. 6). The rod-pivots are equally spaced from the rear boom frame pivot and the front pivot of the transverse guide frame, and the rods are so arranged and so cooperate with the boom frame as to provide a "parallel motion" structure for always maintaining the turntable or saddle in horizontal position irrespective of the angular position of the boom frame.

As shown in Fig. 10, the sliding support 30 may be locked against sliding movement with respect to the transverse guide frame 27 by means of a locking screw 45 threaded within a depending lug on the sliding support and having a head 46 engageable with the adjacent side edge of the transverse guide frame. A conveniently located operating hnadle 47 is secured to the locking screw for rotating the latter. The turntable frame 32 may be locked against turning movement with respect to the sliding support by means of a locking screw 48 threaded within a depending lug integral with the sliding support 30 and having a head 49 engageable with the bottom of the turntable frame. Secured to this screw is a conveniently located handle 50 for rotating the screw. Thus, when the locking screws 45 and 48 are tightened, the parts engaged thereby are frictionally locked in adjusted position.

A lateral extension frame 51 may be attached to either end of the transverse guide frame 27 and has guides 52 aligned with the frame guides 28 so as to provide for an increased range of lateral adjustment of the turntable relative to the boom frame for a purpose to be later explained. This frame is attached to the guide frame 27 by a cross pin 53 passing through aligned openings in the guide frame and side ears 54 on the extension frame, and the latter has a vertical inner portion 55 resting at 56 (see Fig. 9) against the plane end surface of the guide frame. This vertical portion 55 is formed with an opening 57 for receiving the projecting end of the transverse shaft 25. Thus, the extension frame 51 may be firmly secured to the guide frame and may be readily detached for removal or for transfer to the opposite end of the guide frame, as desired. Separate extension frames at both ends of the transverse guide frame may be provided if desired.

Figure 12:
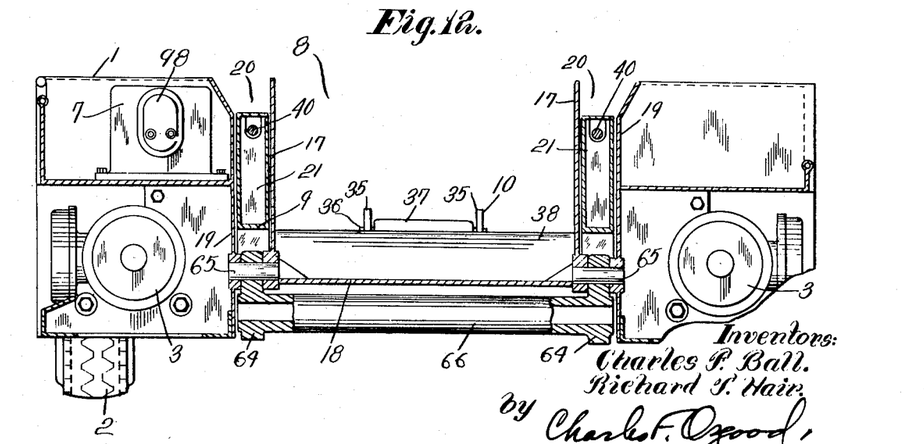
Fig. 12 is an enlarged cross-sectional view taken on lines 12—12 of Fig. 2, showing the timber carrying compartment and the associated body structure, the boom frame and a portion of its elevating mechanism.
Figure 13:
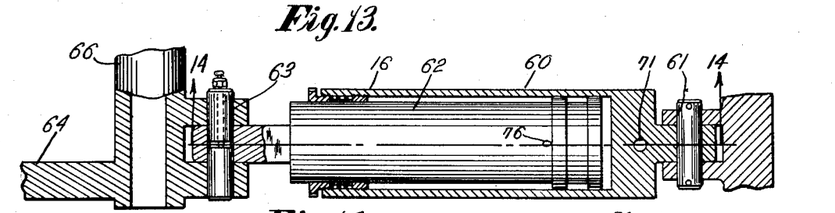
Fig. 13 is an enlarged fragmentary, substantially horizontal, sectional view taken on lines 13—13 of Fig. 2, showing details of one of the elevating jacks.

Now referring to the improved power operated swinging mechanism for the boom frame 9, it will be noted that the hydraulic jack devices 16 are arranged within the bottom portion of the machine body beneath the bottom plate 18 of the load carrying compartment 8, and these jack devices comprise cylinders 60 pivoted at 61 to the bottom of the machine body on horizontal transverse axes to swing in a vertical direction relative thereto. These cylinders contain reciprocable pistons or rams 62 projecting rearwardly through fluid tight packings and having rearward projections pivotally connected at 63 to arms of bell-crank levers 64, 64, herein arranged at the opposite sides of the timber and prop compartment and projecting upwardly into the vertical spaces 20 between the pairs of vertical plates 17, 19. These bell crank levers are pivoted on horizontal shafts 65 supported at the opposite sides of the timber compartment by the vertical plates 17, 19, and these bell crank levers are preferably formed integral with a tubular equalizer shaft or bar 66 extending horizontally beneath the bottom plate of the timber compartment, as shown in Figs. 3 and 12. The other arms of the bell crank levers 64 are pivotally connected to links 67 arranged in the spaces between the plates and which are, in turn, pivotally connected at 68 to the bottom portion of the boom frame 9. Thus, when liquid under pressure is supplied to the forward ends of the cylinders 60, the pistons or rams 62 are moved rearwardly to effect, through the bell crank levers and links, upward swinging of the boom frame on its pivot, and the equalizer bar 66 serves to distribute, equally, the load to the side arms of the boom frame. Either jack device is capable of supporting the boom frame in the event one jack device, for any reason, fails to function. By trapping liquid in the jack cylinders 60, the boom frame may be firmly locked in adjusted position, and lowering of the boom frame may be effected simply by bleeding liquid from the cylinders. In lieu of the hydraulic jack devices disclosed, other types of jack devices, operated hydraulically or otherwise, may be employed.

Figure 14:
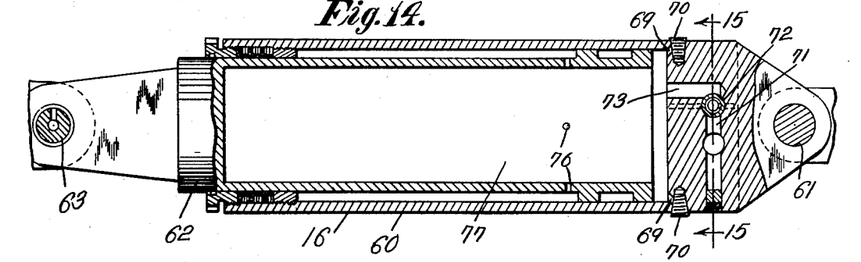
Fig. 14 is an enlarged vertical sectional view taken on line 14—14 of Fig. 13.
Figure 15:
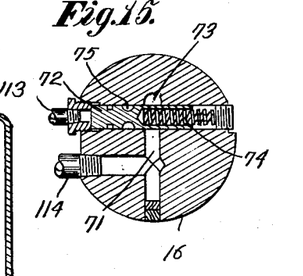
Fig. 15 is a cross-sectional view taken on line 15—15 of Fig. 14.

In this improved construction, the jack cylinders 60 have ports 69 closed by suitable screw plugs 70 (Fig. 14), and these plugs may be loosened or removed for draining purposes. A passage 71 in the front head of each cylinder is communicable under the control of a piston-type safety valve 72 (Fig. 15), with a passage 73 leading to the front end of the cylinder bore at the forward side of the piston. Each piston valve 72 is urged by a spring 74 toward its closed position and, when, subjected to liquid under pressure, is moved against the action of the spring into a position wherein an annular groove 75 between the spools of the valve connects the passage 71 with the passage 73 to admit liquid under pressure to the cylinder portion. In the event the supply of liquid pressure should fail for any reason, the safety valve 72 will automatically close to trap liquid in the cylinder to hold the boom frame from dropping suddenly downwardly without control. This safety holding means for the boom frame is the invention of one John D. Russell and is disclosed and claimed in his copending application Ser. No. 33,890, filed June 18, 1948, now matured into Patent No. 2,570,383, granted October 9, 1951. Ports 76 in the pistons or rams 62 connect the hollow interiors 77 of the pistons with the cylinder bores at the rear sides of the piston heads so that liquid may be trapped in the cylinders at the opposite sides of the piston heads to lock the pistons against movement. The connections for conducting liquid under pressure relative to the hydraulic jack devices will later be fully described.

Figure 16:
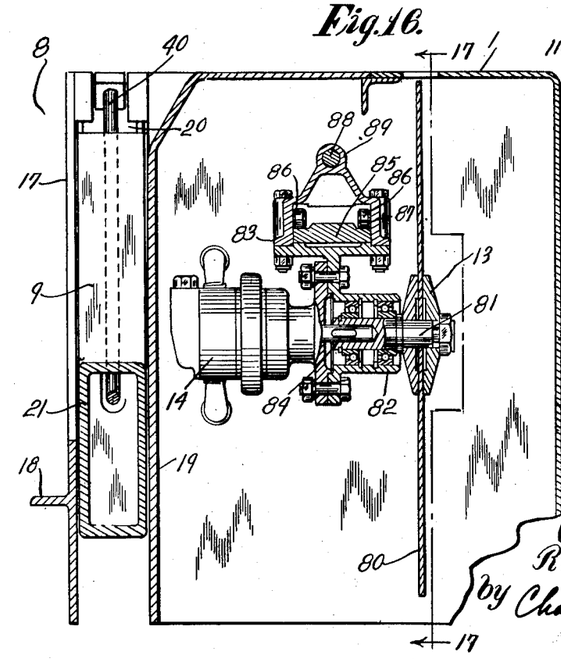
Fig. 16 is an enlarged transverse sectional view taken on line 16—16 of Fig. 11, showing details of the power saw.
Figure 17:
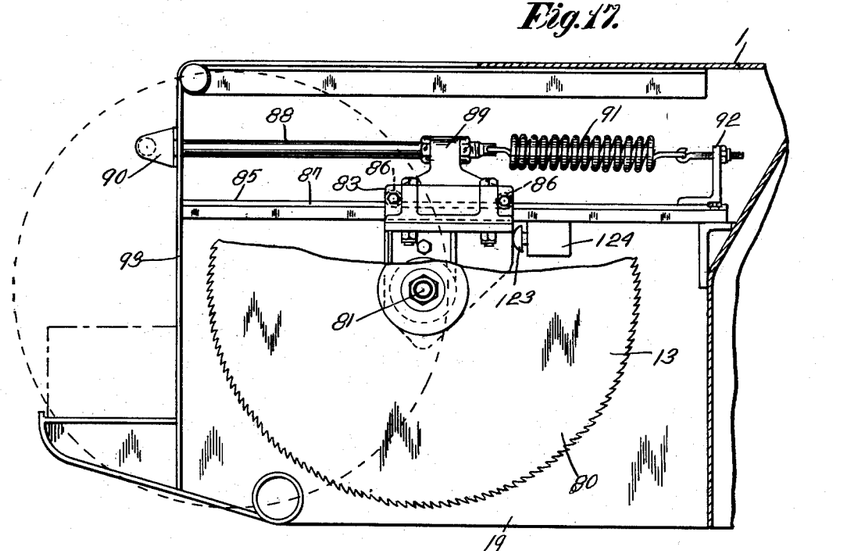
Fig. 17 is a longitudinal vertical sectional view taken on line 17—17 of Fig. 16.

The power saw 13, as shown most clearly in Figs. 16 and 17, comprises a circular saw blade 80 secured to a transverse horizontal shaft 81 suitably journaled in bearings supported within a bearing boss 82 on a sliding support 83. Secured to the sliding support is the hydraulic motor 14 having its power shaft 84 coupled to the shaft 81. The sliding support is guided for horizontal rectilinear movement along a horizontal guide 85 suitably secured within the machine body, and the support carries bearing rollers 86 adapted to run along the upper side surfaces 87 of the guide. A horizontal operating rod 88 is secured to an upstanding lug 89 on the sliding support and has an operating handle 90 located exteriorly of the machine body. A spring 91, connected between the rear end of the rod 88 and an upstanding bracket 92 secured to the inner end of the guide 85, constantly urges the sliding support 83 toward its innermost position with the saw blade retracted within the body. The body is vertically slotted at 93 so that when the arm is slid outwardly against the action of the spring, the saw blade is projected outwardly through the body-slot in position to effect its sawing function. The front end of the machine body has three laterally spaced projections 94, 95 and 96 providing horizontal supports for a timber or prop placed crosswise of the body so that when the timber or prop is properly positioned, the saw may be operated to cut the timber or prop to the desired length. As stated above, the deflector plate 38 on the boom frame is cut away at 39 at its bottom to clear the central projection 95 when the boom frame is in its lowermost position (Fig. 10).

Figure 18:
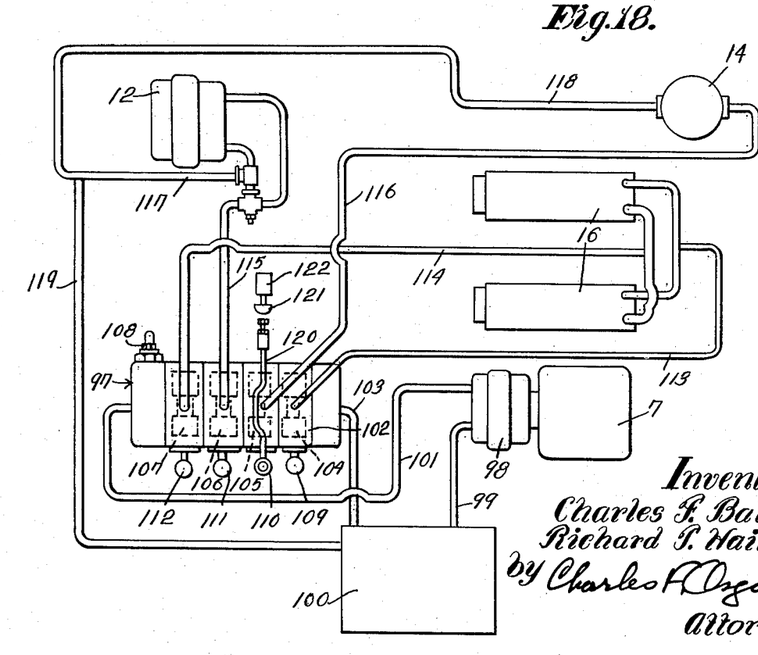
Fig. 18 is a diagrammatic view illustrating the hydraulic system.

A conventional control valve mechanism, generally designated 97, is provided for controlling the flow of liquid under pressure with respect to the various hydraulically operated devices of the machine. The motor 7 drives a pumping means 98 having, as shown diagrammatically in Fig. 18, its intake connected by a conduit 99 to a liquid tank 100, herein suitably carried by the machine body beneath the motor 7. The pump discharge is connected by conduit 101 to the pressure passage of a valve box 102 of the valve mechanism, and a return conduit 103 connects the discharge passage of the valve box back to the tank. This valve box contains conventional balanced spool type slide valves 104, 105, 106 and 107 and a relief valve device 108, and the slide valves have operating handles 109, 110, 111 and 112 respectively. The valve 104 controls liquid flow through a conduit 113 connected by branch conduits to the bores in the cylinder heads receiving the safety valves 72. When the handle 109 of this master valve 104 is released by the operator, the valve automatically moves to its normal position, connecting the conduit 113 to exhaust, causing the safety valves 72 to move to closed position to trap the liquid in the jack cylinders, thereby locking the pistons thereof. The valve 107 for the elevating jacks 16 controls the flow of liquid under pressure through a conduit 114 connected by branch conduits to the cylinder passages 71 so that when the safety valves 72 are in open position, liquid may flow to the cylinder bores to effect piston movement in a direction to swing the boom frame upwardly to elevate the turntable. The valve 107 may be also positioned to connect the jack cylinders to exhaust, and when so positioned, the exhaust is relatively restricted so that the boom frame and turntable may move relatively slowly downwardly. The valve 106 controls the reel driving motor 12 and is positionable to control liquid flow through a conduit 115 to effect operation of the reel driving motor in a direction to wind in the conductor cable. The valve 106 may also be positioned to connect the reel motor to exhaust, thereby to permit rotation of the cable reel in cable unwinding direction with sufficient resistance to reel rotation to keep the cable under suitable tension. The valve 105 controls the power saw 13 and is positionable to control the flow of liquid through a conduit 116 to the saw motor 14. The reel motor 12 and the saw motor 14 have liquid discharge conduits 117 and 118 connected by a conduit 119 back to the tank. When the valve 105 is positioned to effect liquid flow to the saw motor 14, a rod 120 connected to the valve operating handle 110 engages an actuator 121 for a conventional electric switch 122 to effect breaking of the electrical circuits to the electric driving motors 3, 3 for the traction wheels and the pump driving motor 7. The sliding support 83 for the saw engages the actuator 123 for a conventional electric swicth 124 (Fig. 17), so that when the saw is retracted, the switch is open. When the saw is slid outwardly toward its operative position, the switch 124 automatically closes, thereby starting the pump driving motor 7 to supply liquid under pressure to the saw driving motor 14. This switch, when closed, may also move another switch to break the electric circuit for the propelling motors 3, 3 so that wheel propulsion is impossible during sawing, even though the motor 7 may be supplied with current.

Figure 19:
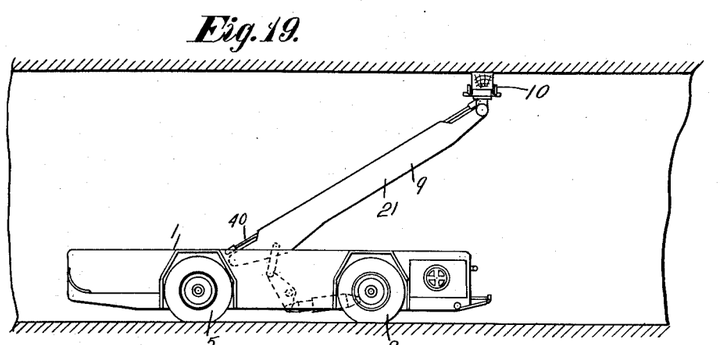
Figs. 19 and 20 are diagrammatic side and end views respectively, showing the machine in an operating position in a mine or tunnel.
Figure 20:
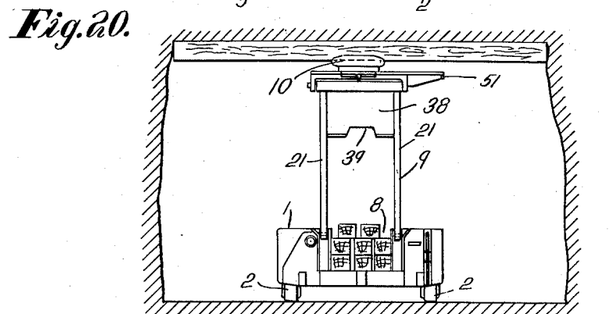
Figure 21:
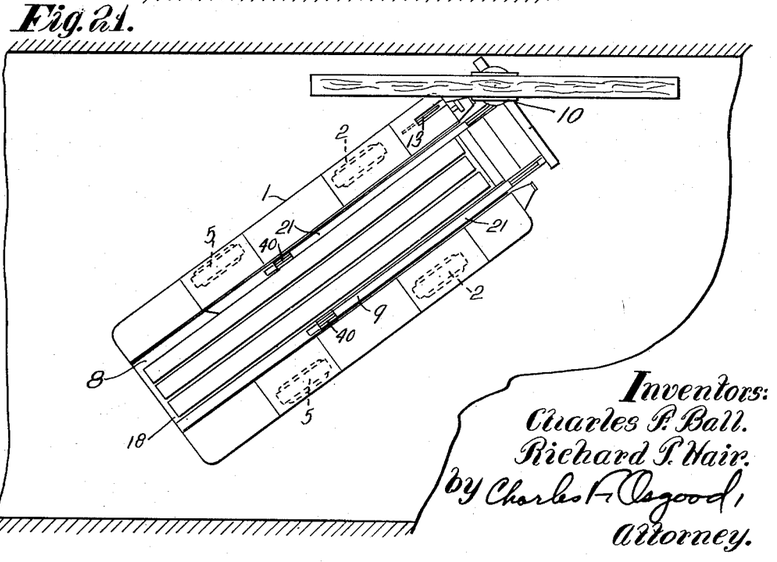
Fig. 21 is a diagrammatic plan view showing the machine in an angled position for setting a cross timber parallel with the rib in preparation to the opening of a cross cut.

The general mode of operation of the improved timber setting machine is as follows: A load of cross timbers and props are piled up in the timber compartment 8 of the machine body in the manner shown diagrammatically in Fig. 20, and when the machine is loaded and the boom frame and turntable are lowered into their transport position, as shown in full lines in Fig. 2, the motors 3, 3 may be operated to drive the front traction wheels 2, 2 to propel the machine about the mine. Steering of the machine during propulsion thereof is effected by the rear steering wheels 5, 5 through the steering gear under the control of the hand wheel 6 located at the operator's station on the machine. When the machine is moving through a mine passageway or tunnel, where there is no overhead trolley wire or other main power source, the conductor cable on the cable reel may be attached to the trolley wire in the main entry or to any other main power source, and as the machine moves bodily forwardly, the cable is pulled off from the cable reel with the cable maintained under suitable tension under the control of the reel driving motor. When the working face of the heading is reached and it is desired to set a cross timber, the valves 104 and 107 may be operated to effect supply of liquid under pressure to the safety piston valves 72 to open the latter, and to admit liquid pressure to the jack cylinders 60 to effect upward swinging of the boom frame to elevate the turntable 10 to the desired position with respect to the timber compartment. The locking screws 45 and 48 may be released and the turntable 10 rotated and slid sidewise on the transverse guide frame 27 relative to the boom frame into the desired timber receiving position. A timber may then be slid lengthwise from the body compartment 8 over the deflecting plate 38 onto the guide rollers 37 and then properly positioned on the turntable platform 34 between the side walls 35. The boom frame may then be swung upwardly to raise the turntable above the top of the machine body and then the turntable may be rotated to rotate the timber crosswise of the machine in the manner shown in Figs. 19 and 20. Upon further upward swinging of the boom frame, the turntable is elevated to move the timber up against the roof and to hold it there during setting of the timber. The elevating jacks 16 for the boom frame have sufficient power and the boom frame structure is sufficiently rigid and is so balanced on the machine body that the timber may be firmly held against the roof during setting thereof even when a loose roof or rock falls are present, thereby making the setting of the cross timber safer for the workmen. As the cross timber is held up against the roof by the boom frame, uprights or props may be placed in position beneath the ends of the timber to set the timber in place, or rib pins may be inserted in the ribs to hold the timber in position. When the operator releases the valve 104, it automatically returns to its normal position, venting the conduit 113 to exhaust, causing the safety valves 72 automatically to close to trap the liquid in the elevating jack cylinders 60 so that accidental dropping of the boom frame and turntable is prevented in the event the liquid supply fails for any reason. To effect controlled lowering of the boom frame and turntable, the valve 104 is positioned to effect opening of the safety valves 72 and the valve 107 is positioned to effect restricted discharge or bleeding of liquid from the jack cylinders. Again, whenever the valve 104 is released by the operator, the safety valves 72 automatically return to their closed position to trap the liquid in the jack cylinders to lock the parts in position.

The power saw 13 may be operated to cut timbers or props to the desired length, and to effect drive of the saw the valve 105 may be positioned to permit the supply of liquid under pressure to the motor 14. A timber or prop may then be placed crosswise of the machine body on the support projections 94, 95 and 96 and the operator may then pull the handle 90 outwardly to move the saw blade 80 into sawing relation to the timber or prop, and when the saw is pulled outwardly, the switch 124 is operated to effect running of the pump driving motor to supply liquid under pressure to the saw driving motor 14 to rotate the saw. The saw blade is manually fed toward the work by the pull on the handle 90, and when the handle 90 is released by the operator, the saw blade automatically is retracted by the spring 91 within the machine body out of harm's way. Whenever the valve 105 is positioned to effect operation of the saw driving motor 14, the electric switch 122 is actuated to break the circuit for the propelling motors 3 and pump driving motor 7 to prevent propulsion of the machine during the sawing operation and to stop the pump, thereby to increase the safety factor. The pump driving motor is started automatically by the switch 124 only when the saw is pulled outwardly to its operating position. The switch 124 may also prevent establishment of an operating circuit of the propelling motors 3. This safety control for the propelling motors and the saw is the joint invention of C. F. Ball and James W. Woolf and is disclosed and claimed in their copending application Ser. No. 25,203, filed May 5, 1948, now matured into Patent No. 2,715,425, dated August 16, 1955.

As a result of this invention, an improved timber setting machine is provided whereby the laborious, dangerous and time-consuming task of setting cross timbers is made comparatively easy, and the danger resulting from roof falls during setting of the timber is substantially reduced. By arranging the carrying compartment for the mine timbering elements in the manner disclosed, and by mounting the boom frame to straddle the compartment, not only is large timbering-element-carrying capacity provided but also extreme compactness and ruggedness are attained. By the provision of the improved elevating mechanism for the boom frame arranged and mounted in the manner disclosed, an extremely powerful lifting force is obtained whereby a timber may be quickly raised up against the roof and firmly held there during setting of the timber. The novel timber receiving and carrying turntable or saddle mounted and arranged in the manner disclosed, enables the rapid transfer of a timber from the body-compartment regardless of the piled height and lateral position of the timber. The machine is made relatively safe not only because of its power and ruggedness, but also due to the provision of the safety control for the boom-lift cylinders and the power saw, so that inadvertent dropping of the timber support due to failure of the liquid pressure supply and bodily movement of the machine during the sawing operation are avoided. The machine is not only powerful and rugged but is also extremely compact, well adapted for use in underground mines or tunnels having low head room; and also by the provision of the improved controls, ease in maneuvering and flexibility in operation are attained. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What we claim as new and desire to secure by Letters Patent is:

1. In a timber setting machine, a portable body having a horizontal platform adapted to receive a load of timbers arranged lengthwise of said body, a U-shaped boom frame pivotally mounted on said body at the opposite sides of the timber load with the arm pivots located above said platform, a horizontal timber receiving and supporting turntable carried at the outer extremity of said boom frame, said boom frame being swingable on its pivots to position said turntable with respect to said body to enable endwise movement of a timber from said body onto said turntable, and power operated mechanism for swinging said boom frame comprising a power operated device mounted on said body beneath said platform and operative connections between said power operated device and the arms of said boom frame including a rotatable equalizer bar extending transversely of said body beneath said platform and operative connections between the opposite ends of said equalizer bar and the arms of said boom frame.

2. In a timber setting machine, a portable body having a horizontal platform adapted to receive a load of timbers arranged lengthwise of said body, a U-shaped boom frame pivotally mounted on said body at the opposite sides of the timber load with the arm pivots located above said platform, a horizontal timber receiving and supporting turntable carried at the outer extremity of said boom frame, said boom frame being swingable on its pivot to position said turntable with respect to said body to enable endwise movement of a timber from said body onto said turntable, and power operated mechanism for swinging said boom frame including hydraulic cylinder and piston devices arranged within the opposite sides of the bottom of said body beneath said platform, bell crank levers pivoted on said body and operatively connected to said devices and an equalizer bar extending transversely of said body beneath said platform and to which said bell crank levers are secured and operative connections between said bell crank levers and the arms of said boom frame.

3. In a timber setting machine, the combination comprising a portable body adapted to carry a load of mine timbers with the latter arranged side by side in substantially parallel longitudinal relation with respect to said body, a boom frame pivotally mounted at one end on said body to swing in a vertical plane relative thereto, a transverse guide frame carried at and extending across the outer extremity of said boom frame and providing a transverse horizontal guideway, a timber-receiving and supporting saddle, means for mounting said saddle for turning movement about an upright axis and for lateral guided movement along said guideway whereby, when said boom frame is in a lowered position with respect to said body, said saddle may be adjusted selectively into longitudinal alignment with any one of the piled up timbers at one end of said body, whereby a timber with which said saddle is in alignment may be moved endwise from said body onto said saddle without bodily lifting of the timber, and means for swinging said boom frame about its pivot to effect raising and lowering of said saddle, and operable, when the latter is turned into a transverse position on its swivel mounting, to elevate said saddle to bring the timber on said saddle up against the mine roof.

4. In a timber setting machine, the combination comprising a portable body adapted to carry a load of mine timbers arranged side by side in substantial parallelism longitudinally of said body, a boom frame pivotally mounted at one end on said body to swing in a vertical plane relative thereto, said boom frame projecting longitudinally beyond one end of said body, a transverse guide frame carried by and extending across said projecting end of said boom frame beyond said end of said body, and a timber-receiving support mounted on said guide frame and adjustable laterally therealong selectively into different timber-receiving positions into longitudinal alignment with any one of the timbers of said load whereby the timbers may be individually moved endwise from said body onto said support without bodily lifting of the timber.

5. In a timber setting machine, the combination comprising a portable body adapted to carry a load of mine timbers arranged side by side in substantial parallelism generally longitudinally of said body, a boom frame pivotally mounted at one end on said body to swing in a vertical plane relative thereto and extending longitudinally of said body with its outer end projecting beyond one end of said body, a transverse guide frame carried by and extending across said projecting end of said boom frame at said end of said body, a timber-receiving support mounted on said guide frame and adjustable laterally therealong into different timber-receiving positions selectively into longitudinal alignment with any one of said timbers of said load whereby the timbers may be individually moved endwise from said body along said boom frame onto said support without bodily lifting of the timber, and a timber guide carried by said boom frame and extending thereacross in parallelism with and rearwardly of said guide frame for directing any one of the timbers moved lengthwise along said boom frame onto said support irrespective of the lateral position of adjustment of said timber-receiving support along said guide frame.

6. In a timber setting machine, the combination comprising a portable body adapted to carry a load of mine timbers with the latter arranged side by side in substantially parallel relation longitudinally with respect to said body, a boom frame pivotally mounted at one end on said body to swing in a vertical plane relative thereto, a transverse guide frame carried at the outer extremity of said boom frame and providing a transverse horizontal guideway, a timber-receiving and supporting saddle, means for mounting said saddle for turning movement about an upright axis and for lateral guided movement along said guideway whereby when said boom frame is in a lowered position said saddle may be adjusted selectively into longitudinal alignment with any one of the timbers at one end of said body, and the timber with which said saddle is in alignment being movable endwise from said body onto said saddle without bodily lifting of the timber, means for swinging said boom frame to effect raising of said saddle when the latter is in a transverse position on its swivel mounting to bring the timber on said saddle up against the mine roof, and a transverse timber guide carried by and extending across said boom frame in parallelism with said guide frame and located rearwardly of said saddle, said guide being of sufficient width to guide and direct any one of the parallel timbers with respect to said saddle as the timber is moved lengthwise of said boom frame onto said saddle and irrespective of the laterally adjusted position of said saddle along said transverse guideway.

7. In a timber setting machine, the combination comprising a portable body having a horizontal surface for carrying a load of mine timbers centrally between the sides thereof with the timbers piled up in superimposed relation at different heights one on top of another and with the timbers extending in substantial parallelism longitudinally of said body, a boom frame pivotally mounted at its inner end on said body to swing in vertical planes relative thereto, said boom frame pivot located longitudinally of said body intermediate the ends thereof laterally of the outer sides of said horizontal surface which carries the timber load with said pivot spaced a substantial distance from the ends of said body longitudinally of the latter, means for swinging said boom frame about its pivot, a horizontal timber-receiving and supporting saddle located on said body beyond the adjacent end of the timber load and swivelly mounted at the outer extremity of said boom frame to turn about an upright axis, said boom frame being swingable about its pivot to locate said saddle at different elevations with respect to said body at one end of the latter to bring said saddle successively into longitudinal alignment with any one of the piled-up superimposed timbers to permit the timber at the top of the pile and with which said saddle is in longitudinal alignment to be moved directly endwise from said body onto said saddle without lateral shifting and manual bodily lifting of the timber, and said boom frame being swingable, when said saddle is turned transversely on its swivel, to elevate said saddle above said body to bring the timber on said saddle up against the mine roof.

8. In a timber setting machine, the combination comprising a portable body having a horizontal platform of substantial width arranged centrally between the sides thereof for receiving a load of mine timbers with the latter arranged in substantial parallelism longitudinally of said body, a boom frame pivotally mounted at its inner end on said body beyond the sides of and at a relatively high point above said platform and laterally outside of the timber load, the boom pivot located longitudinally intermediate the ends of said platform with the pivot spaced a substantial distance from the ends of said body longitudinally of the latter, a horizontal timber-receiving and supporting saddle located on said body beyond the adjacent end of said platform in adjacency to one end of said body, means for swivelly mounting said saddle on the outer extremity of said boom frame to turn about an upright axis, said boom frame being swingable in vertical planes about its pivot to locate said saddle in a relatively low position near the level of said platform to permit a timber carried on said platform to be moved directly endwise without lateral shifting and lifting from said platform onto said saddle, and power operated mechanism for swinging said boom frame about its pivot to elevate said saddle when the latter is turned transversely on its swivel mounting, above said body to bring a timber on said saddle up against the mine roof, said swinging mechanism including a power operated device mounted in a relatively low position on said body beneath said platform and below the timber load, and operative transmission connections between said power operated device and said boom frame and including motion transmitting elements actuated by said device and extending along one side of said platform below the boom frame pivot and laterally beyond the sides of said platform laterally outside of the timber load, said elements connected to said inner end of said boom frame beyond the outer sides of said platform.

9. In a timber setting machine, the combination comprising a portable body having a horizontal bottom platform of substantial width arranged centrally between sides thereof for receiving a load of mine timbers with the latter arranged in substantial parallelism longitudinally of said body, a boom frame pivotally mounted at its inner end of said body at the opposite sides of and at a relatively high point above said platform near the top of said body and laterally of said platform beyond the outer sides of the timber load, the boom frame pivot located longitudinally of said body intermediate the ends of said platform with the pivot spaced a substantial distance from the ends of said body longitudinally of the latter, a horizontal timber-receiving and supporting saddle in adjacency to one end of said platform, means for swivelly mounting said saddle on the outer extremity of said boom frame to turn about an upright axis, said boom frame being swingable in vertical planes about its pivot to position said saddle in a relatively low position near the level of said platform to permit a timber carried on said platform to be moved directly endwise without lateral shifting and lifting from said platform onto said saddle, and power operated mechanism for swinging said boom frame about its pivot to elevate said saddle and operable when the latter is turned transversely on its swivel mounting, above said body to bring a timber on said saddle up against the mine roof, said mechanism including a power operated device mounted in a relatively low position on said body beneath said timber-receiving platform and below the timber load, and transmission connections between said power operated device and said boom frame and including a power transmitting connection extending transversely of said body beneath said timber-receiving platform and cooperating upstanding elements arranged at the sides of and actuated by said transverse connection, said elements connected to the sides of said boom frame laterally beyond the outer sides of said platform laterally outside of the timber load.

10. In a timber setting machine, the combination comprising a portable body having a horizontal bottom platform of substantial width arranged centrally between its sides for receiving a load of mine timbers with the latter arranged in substantial parallelism generally lengthwise of said body, a U-shaped boom frame having parallel side arms and an outer cross connecting portion, said side arms pivotally mounted at their inner ends on said body at the opposite sides of said platform and beyond the sides of said platform laterally of the timber load with said boom frame straddling the timber load, the arm pivots being located above the level of said platform at the sides of the latter and near the top of said body intermediate the ends of the latter with the pivots spaced a substantial distance from the ends of said body longitudinally of the latter, a horizontal timber-receiving and supporting saddle, means for swivelly mounting said saddle on said outer cross connecting portion of the U-frame, said U-shaped boom frame being completely open between said side arms rearwardly of said cross connecting portion to provide for straddling of the timber load as aforesaid, said boom frame swingable in vertical planes about its pivot to position said saddle in a relatively low position in adjacency to one end of said body and close to the level of said platform so that a timber may be moved endwise from said platform onto said saddle without manual bodily lifting of the timber, and power operated mechanism for swinging said boom frame in vertical planes about its pivot to elevate said saddle, when the latter is turned transversely on its swivel mounting, comprising a power operated device located in a relatively low position beneath said platform intermediate the ends of the latter and connections between said power operated device and said arms of said boom frame and including a transmission element extending from said power operated device laterally beneath said platform and cooperating elements extending upwardly beyond the sides of said platform laterally of the timber load into connection with the inner ends of said arms respectively.

11. In a timber setting machine, the combination comprising a portable body having a timber-receiving compartment of substantial width and depth extending centrally lengthwise thereof for receiving a load of piled-up mine timbers with the latter arranged in superimposed substantial parallel relation and extending generally lengthwise of said body, said compartment having a horizontal bottom located in a relatively low position on said body, upright sidewalls extending to the top of said body and an open end, a boom frame generally U-shaped in plan and having parallel side arms pivotally mounted at their inner ends on said body at the sides of said compartment outwardly beyond said upright sidewalls, said boom frame pivots located on said body longitudinally intermediate the ends of said compartment with the arm-pivots spaced a substantial distance from the ends of said body longitudinally of the latter and said boom frame straddling the timber load received in said compartment, a horizontal timber-receiving support carried at the outer extremity of said boom frame by the cross portion of the U-frame and disposed in adjacency to one end of said body beyond said open end of said compartment, said U-shaped boom frame being completely open between said side arms rearwardly of said cross portion to provide for straddling of the timber load as aforesaid, and means for swinging said boom frame in vertical planes about its pivot to move said support through a wide range of elevated positions succesively in longitudinal alinement with the piled-up timbers including a lowered position close to the level of the compartment bottom and elevated positions above said lowered position including a position near the top of said compartment to permit a timber to be moved endwise from said compartment at different elevations onto said support thereby to avoid substantial manual lifting of the piled-up timbers, and said U-shaped frame when in said lowered position having its side arms extending longitudinally along the outer sides of said compartment entirely outside and below the top of said compartment.

12. In a timber setting machine, the combination comprising a portable body having a timber-receiving compartment of substantial width and depth extending centrally lengthwise of said body, said compartment having a horizontal bottom disposed in a relatively low position on said body, upright sidewalls extending to the top of said body and an open end, a boom frame pivotally mounted at its inner end on said body with its pivot located outside of said compartment beyond the sides of the timber load in said compartment, the boom frame pivot located on said body longitudinally intermediate the ends of said compartment with the pivot spaced substantial distances from the ends of said body longitudinally of the latter, a horizontal timber-receiving support carried at the outer extremity of said boom frame in adjacency to one end of said body and disposable beyond said open end of said compartment, and power actuated means arranged on said body outside of said compartment and below the top of said body for swinging said boom frame in vertical planes about its pivot, said support being positionable by swinging of said boom frame selectively opposite the ends of different ones of the piled-up timbers in said compartment to permit any one of the timbers to be moved endwise from said compartment onto said support without substantial manual lifting of the timbers, and said boom frame swingable downwardly into its lowermost position below the top of said body to locate said support near the level of said compartment bottom.

13. In a timber setting machine, the combination comprising a low compact body having a compartment of substantial width and depth extending centrally longitudinally of said body, said compartment having a bottom disposed in a relatively low position on said body, upright sides extending to the top of said body and an open end, said compartment receiving a load of piled-up mine timbers with the latter arranged in superimposed relation in substantial parallelism generally lengthwise of said body, propelling and steering devices for supporting and propelling said body, a horizontal timber-receiving support arranged in adjacency to one end of said body beyond said open end of said compartment and disposable selectively at different elevations opposite the ends of different ones of the piled-up timbers to permit any one of the timbers to be moved endwise from said compartment onto said support without substantial manual lifting of the timbers, an adjustable supporting structure on said body and adjustable relative thereto, said supporting structure mounted on said body outside of said compartment for supporting said timber support and for adjusting the elevation of said support to locate the same in aforesaid different timber-receiving positions, and adjusting means for adjusting said supporting structure relative to said body as aforesaid.

14. A timber setting machine as set forth in claim 13 wherein said timber-receiving support is also disposable laterally into different positions into alignment with the timbers which are disposed side by side in said compartment and said adjustable supporting structure embodies means providing for adjustment of said support laterally relative to said body across said one end of the latter, irrespective of the elevated position of said support.

15. In a timber setting machine, the combination comprising a portable body adapted to travel over the floor of a mine or tunnel and having a timber-receiving compartment of substantial width and depth extending centrally lengthwise of said body, said compartment having a horizontal bottom, spaced vertical sides and an open end with the latter disposed at one end of said body, said compartment receiving a load of piled-up mine timbers with the latter arranged in substantial parallelism generally lengthwise of said body, a horizontal timber-receiving support arranged in adjacency to said end of said body beyond said open end of said compartment, an adjustable supporting structure on said body and adjustable relative thereto, said supporting structure mounted outside of said compartment for adjusting said support into different elevated positions selectively opposite the adjacent ends of different ones of the piled-up timbers in said compartment to permit any one of the timbers to be moved endwise from said compartment onto said support without substantial manual bodily lifting of the timbers, and said support, when said supporting structure is in its lowermost position, disposed below the top of said body beyond said open end of said compartment, and means for adjusting said supporting structure relative to said body to position said support as aforesaid.

16. A timber setting machine as set forth in claim 15 wherein said adjustable supporting structure embodies means providing for adjustment of said timber-receiving support laterally across the open end of said body into alignment with timbers which are disposed side by side in said compartment, irrespective of the elevated position of said support.

17. In a timber setting machine, the combination comprising a portable body adapted to travel along the floor of a mine or tunnel and having a timber-receiving compartment of substantial width and depth extending centrally lengthwise of said body, said compartment having a horizontal bottom disposed in a relatively low position near the bottom of said body, upright sides extending to the top of said body and an open end, said compartment adapted to receive a load of mine timbers arranged side by side and piled-up in superimposed relation with the timbers extending in substantial parallelism generally lengthwise of said body, a timber-receiving support arranged in adjacency to one end of said body beyond said open end of said compartment, and an adjustable supporting structure mounted on said body outside of said compartment for supporting said timber support and adjustable in vertical planes relative to said compartment to locate said support in different elevated positions relative to said body, said supporting structure including supporting and guiding means for said support providing a transverse guideway along which said support is adjustable for locating said support in different lateral positions relative to said supporting structure irrespective of the elevation of said support to bring the latter selectively into longitudinal alignment with any one of the timbers of the timber load in said compartment thereby to permit the timbers to be individually moved endwise from said compartment onto said support without substantial manual bodily lifting of the timbers.

18. In a timber setting machine, the combination comprising a portable body having a timber-receiving compartment of substantial width and depth extending centrally lengthwise thereof for carrying a load of piled-up mine timbers with the latter extending generally longitudinally of the body, said compartment having a horizontal bottom, vertical sidewalls and an open end, said body having vertical walls parallel with and spaced outwardly from said sidewalls to provide relatively narrow vertical spaces extending longitudinally at the sides of said compartment and opening outwardly through the end of said body at said open end of said compartment, a boom frame generally U-shaped in plan and having parallel side arms carrying at their outer ends a transverse connecting portion with the latter disposable in advance of said end of said body, said boom frame straddling the timber load in said compartment and said side arms extending into said longitudinal spaces between said vertical walls at the opposite sides of said compartment, said U-shaped boom frame being completely open between said side arms rearwardly of said transverse connecting portion to provide for straddling of the timber load as aforesaid, said side arms pivotally mounted at their inner ends on said body outside of said compartment to swing in vertical planes relative to said body, a horizontal timber-receiving and supporting member carried by said transverse portion of said boom frame beyond said open end of said compartment, and means for swinging said boom frame about its pivot to change the elevation of said receiving and supporting member with respect to said compartment to permit any one of the piled-up timbers to be moved endwise from said compartment directly onto said receiving and supporting member.

19. In a mine timbering machine, the combination comprising a portable base having a relatively low timber-carrying body and supporting and propelling means for supporting said body for movement over the floor of a mine, said body having a timber-receiving compartment of substantial width and depth extending centrally longitudinally thereof substantially throughout the length of said body, said compartment receiving a load of mine timbers with the latter extending in substantial parallelism generally longitudinally of said body, a boom frame pivotally mounted at its inner end on said body outwardly beyond the sidewalls of said compartment, said pivotal mounting being located intermediate the ends of said base nearer one end of said base than to the other end thereof, the boom frame pivot being spaced substantial distances from the ends of said base longitudinally of the latter, a timber-receiving turntable journaled at the outer end of said boom frame beyond said other end of said base, said boom frame being swingable downwardly on its pivotal mounting into a lowered position below the top of said body to locate said turntable in a relatively low timber-receiving position with respect to said body successively in alinement with the piled-up timbers to permit any one of the timbers of the timber load to be moved endwise from said compartment directly onto said turntable, and power operated lifting devices mounted on said base and located in a relatively low position beneath said boom frame outside of said compartment, means for connecting said lifting devices to said boom frame and including lifting elements on said body and connected to said boom frame laterally of said compartment and below the top of said body for swinging said boom frame upwardly about its pivot to raise said turntable from a position near the bottom of said compartment into a relatively high timber-supporting position above said body, close to the mine roof, said lifting devices operable to lock said boom frame in adjusted position to hold the timber on said turntable firmly up against the roof during setting of the timber.

20. In a mine timbering machine, the combination comprising a portable base having a body provided with a timber-receiving compartment of substantial capacity extending longitudinally of said body for receiving a load of mine timbers with the latter arranged in said compartment generally lengthwise of said body, an elongated boom frame generally U-shaped in plan straddling the timber load in said compartment and having parallel side arm portions providing the legs of the U and pivotally mounted at their inner ends on said body outwardly beyond the sidewalls of said compartment and a cross connecting frame at their outer extremities providing the base of the U and located in adjacency to one end of said body, said U-shaped boom frame being completely open between said side arm portions rearwardly of said cross connecting frame to provide for straddling of the timber load as aforesaid, a timber-carrying turntable journaled on said cross connecting frame, said boom frame being swingable downwardly about its pivot into a lowered position below the top of said body to locate said turntable in a relatively low timber-receiving position with respect to the bottom of said compartment, said turntable being positionable to receive a timber moved endwise from said compartment directly onto said turntable, and said turntable also being turnable with respect to said boom frame to position the timber carried thereby transversely of said base, and power operated devices connected between said boom frame and said base and operable to effect upward swinging of said boom frame to locate said turntable in a relatively high timber-supporting position above said body with the timber engaging the mine roof and to hold said boom frame in adjusted position to provide a firm support for the timber for holding the latter up against the mine roof during setting of the timber.

21. In a timber setting machine, the combination comprising a portable body having a timber-receiving compartment of relatively large capacity extending centrally lengthwise thereof for receiving a load of mine timbers with the latter arranged generally lengthwise of said body, said compartment having a horizontal bottom disposed in a relatively low position on said body, vertical sides and an open end, the latter opening outwardly through one end of said body, a timber-receiving saddle located at said end of said body beyond said open end of said compartment and positionable to receive any one of the timbers moved endwise from said compartment onto said saddle, and an adjustable supporting structure for said saddle for positioning the latter to receive a timber and for elevating said saddle to bring a timber thereon up against the mine roof, said supporting structure pivotally mounted and arranged on said body wholly outside of said compartment and including supporting and guiding means providing a transverse supporting guideway for said saddle, said saddle adjustable along said supporting guideway laterally from one side of said open end of said compartment to the other successively in alinement with the timbers to permit the timbers to be selectively moved from said compartment at different lateral positions onto said saddle without manual bodily lifting of the timber.

22. A timber setting machine as set forth in claim 21 wherein releasable locking means is provided for locking said saddle in its different adjusted positions along said guideway, said locking means comprising an adjustable locking element on one part and lockingly engaging the other part.

23. In a timber setting machine, a base, a U-shaped elevator boom pivotally mounted on said base to swing in vertical planes with respect thereto and having parallel side arms, a timber-support carried at the outer extremity of said boom, and power operated mechanism on said base for swinging said boom about its pivot comprising a power operated device on said base, and operative connections between said power operated device and said parallel arms of said boom including a rotatable equalizer bar extending transversely of said base, connections between said power operated device and said equalizer bar and connecting elements between the opposite ends of said equalizer bar and said arms of said boom.

24. In a timber setting machine, a base, an elevator boom pivotally mounted on said base to swing in vertical planes relative thereto, a transverse guide frame carried at and extending across the outer extremity of said boom and providing a transverse horizontal guideway, a timber-support mounted on said guide frame for lateral guided movement along said guideway from one side of said boom to the other, and a transverse guide carried by said boom and extending across the outer extremity thereof rearwardly of and in parallelism with said guide frame for guiding a timber onto said timber-support in any of the laterally adjusted positions of the latter along said guideway.

25. In combination, a base adapted to carry a load of mine timbers arranged longitudinally in side by side relation on said base, a timber-support, means for mounting said timber-support on said base for lateral adjustment relative thereto from one side of said base to the other, and an elongated guide extending transversely substantially the width of the timber load for guiding any of the timbers during movement of a timber in an endwise direction from said base onto said timber-support in any adjusted position of the latter laterally relative to said base.

26. In combination, a base adapted to carry a load of mine timbers arranged longitudinally in side by side relation on said base, a timber-support, means for mounting said timber-support on said base for lateral adjustment relative thereto, and an elongated guide for guiding any of the timbers during movement thereof in an endwise direction from said base onto said timber-support in any adjusted position of the latter laterally relative to said base, said mounting means including means for adjusting the elevation of said timber-support relative to said base, said timber guide adjustable into different elevated positions with said timber-support whereby timbers piled up at different heights on said base may be moved endwise from said base over said guide onto said timber-support.

References Cited in the file of this patent

UNITED STATES PATENTS

| | | |
|---|---|---|
| 2,336,386 | Beck | Dec. 7, 1943 |
| 2,365,176 | Curtis | Dec. 19, 1944 |
| 2,408,387 | Gay et al. | Oct. 1, 1946 |